Patented Feb. 26, 1946

2,395,498

UNITED STATES PATENT OFFICE 2,395,498

TREATING PLANT PRODUCTS

Harry A. Noyes, Marlborough, Mass.

No Drawing. Application August 26, 1940,
Serial No. 354,253

7 Claims. (Cl. 99—205)

My invention relates to new and improved products that are either made or concentrated through employing controlled refrigeration. The invention includes the preparation of distinctive products from both mixtures of solids and liquids, and of liquids that have been cooled to temperatures below their freezing points, or to where the whole mass becomes quite solid.

I do not hold that my discoveries use alone, any one of the three kinds of freezing currently recognized as "slow," "sharp" or "quick." All three kinds may be employed in the production of a single product.

Among objectives of this invention are:

The production of more nearly "natural" fruit and vegetable concentrates;

The production of more nearly "natural" fruit and vegetable juices;

The production of products made up of several constituents having widely different solubilities by controlling both the application of the refrigeration and the subsequent dissipation of the same;

The production of medicinal concentrates through the use of refrigeration both in the concentration and the purification steps;

The refining and clarification of drug containing and other substances through utilizing the consequences of "solubility product" phenomena existing at temperatures below the freezing point of water;

The addition of soluble substances to give lower freezing points to solutions of low solids content in order to better handle the carrying out of ice separations therefrom through controlled refrigeration applications and the slow dissipation of their consequences;

The controlled formation of ice as a means of concentration and/or separation of soluble and insoluble constituents present;

The concentration of water soluble substances in solution by lowering the temperature of the solutions to below the points at which theoretically the concentration desired would be obtained by the freezing out of water, in order that the possible inhibitory effects of supercooling and supersaturation that accompany the presence of colloids and viscosities (in greater measure than those of sodium chloride solutions having equal freezing points) shall not occur, and that the ice crystals may then rearrange themselves on the application of heat—applied at such rate—that the temperature of the mass can be uniform except for the internal heat transfer due to reactions and changes of state;

And, finally the carrying out of any of the above objectives with more than one cycle of cooling and then warming.

The use of fruit and vegetable juices is on the increase. Juices having specific properties are included in dietary programs and the beneficial effects of including "natural" products in the diet are being recognized to an increasing degree.

Plants are sources of drugs and other compounds having specific medicinal values. The extraction of these substances from plants by the use of water, alcohol, etc., preserving them, concentrating them, etc. is the business of parts of the manufacturing drug industry. It is recognized, within the industry, that plants from certain localities yield different products and that methods of processing have to be varied to get comparable products from different lots of plants processed. All manufacturers and consumers would benefit if processes were developed that gave products that uniformly had more "natural" color, flavors and tastes.

In my Patent 2,342,962, granted February 29, 1944, pursuant to my application Serial Number 354,254, I have described the production of distinctive products that are more nearly "natural" through employing vacuum distillation at low temperatures to take off and preserve compounds that are customarily lost. This is a distinct advance in the art and has wide as well as specific applications. The present invention accomplishes the concentration of substances in solution at temperatures which are low enough to prevent fermentation, deterioration, etc., while the concentration is being carried out.

It is well known that the handling of one variety of fruit to produce a juice, having quality characteristics, is different from that required to produce equal quality from another. Fruits are not only different, in substantial ways, as to kinds but as to varieties of species which is now recognized by the Patent Office in the granting of Letters Patent for new varieties of plants.

The invention is applicable to virtually all liquids carrying substances in solution and especially to juices and extracts of virtually all fruits, vegetables and plants. In commercial use, however, it will mainly be applied to those fruit juices which are articles of commerce or have popular appeal. Certain phases of the invention also relate to extracts which are made from portions of plants and the products thereof by leaching with water.

In its application to juices which are obtained from fruits by macerating, crushing or pressing, the fundamental principles of the invention comprise freezing a quantity of the juice to a virtually solid mass, and thereafter adding heat to the mass with careful control of the quantity of heat added and the rate of addition such that the effects of heat are virtually uniformly distributed throughout the mass as a whole and liquefaction occurs at the faces of crystals within the mass. Fractions of the liquid containing respectively different concentrations of soluble solids are successively drawn off following successive additions of heat to the mass. The temperature of the mass is not allowed to rise to the freezing point of water until so much of the juice as it is desired to obtain has been removed.

More especially, one procedure is to take the juice as it comes from the presses, pass it over cooling coils or surfaces that rapidly lower its temperature nearly or substantially to its freezing point, then pass the juice into containers, and extract heat from such containers until water in their contents separates in the form of ice and the entire contents reach a physical state that may be termed virtually solid. The temperature at which this state is reached may be below the recognized freezing point of the solution present, the distance in degrees below the freezing point of the original solution being dependent on the nature of the substances principally in solution. Many juices contain colloidal substances which allow them to supercool, and eventually ice begins to form and increases with lapse of time and as the temperature is lowered. The juice may be seeded with ice crystals and may be stirred to hasten cooling and upset conditions of supersaturation and supercooling. Grape juice constituents change after the juice has been pressed out of the grapes, and from the reactions then occurring more potassium bitartrate is produced than is soluble in the solution. This excess crystallizes out in time as "argols". The separation of "argols" is not necessarily aided by such stirring as their higher specific gravity than that of the solution and slow settling, along with other substances present, have a collecting and clarifying effect on the juice. If the containers are, for example, closed wooden or aluminum barrels and the cooling effect is applied externally the ice forms first around the walls and the more concentrated liquid resulting is thereby forced in some measure toward the centres of such containers as the freezing progresses, and until the whole mass center included, stiffens and becomes virtualy solid.

The temperature of the freezing point of the juice will preserve it for some time without appreciable change and so it is not necessary to use more than about one third of the refrigeration that will be eventualy used on a batch, during the few weeks that the year's grape crop is being pressed. Once the pressing season is over, or at any time when there is available refrigeration, the temperatures of the refrigerating rooms, coils, etc., are lowered to hasten the freezing of water and produce the substantially solid condition. The cooling, on the whole, is not "quick freezing". I find it desirable to continue the cooling, then or later, until the whole mass is virtually solid. In this specification the terms "virtually solid," "quite solid," "substantially solid" and the like signify the condition when the properties of a liquid cease to be evident in the frozen mass.

It is evident that when tanks of three thousand gallons or more capacity are used, the maintenance of a rate of cooling equal to that in smaller containers will require, for example, lower temperatures, and agitation or cooling agencies to be placed in the tanks. Coils placed in the tanks may be so located and operated that the cooling proceeds from the centres out, which is the direct opposite to the effect in ordinary barrels piled in low temperature storage rooms. In a tank system employing coils both heat extraction from some tanks and heat addition to others can be carried on by employing the same cooling brine to take heat from one tank or group of tanks and give it up to another. In employing this manner of heat transfer, it is not essential that the temperature differential between the brine (or other cooling agent) and the solution to be cooled be the same as that between the solution to be warmed and the brine. After such a system has been set in operation, no harm will come as the rate of heat transfer lessens.

Substantially congealed mixtures of juice constituents are the materials from which I extract the concentrate, regular solutions, and dilute solutions. It is well known that ice is a better conductor of heat than water and, in the practically solidified mass to which heat is to be added, there is virtually a system of contacts of ice to ice throughout the mass. When a source of heat is applied rapidly to the outside surface of a container of the solidified material ice is melted to such an extent that a more dilute liquid drains away than would be the case if the heat were uniformly distributed through the whole mass. As an example, if hot water is poured on the outside of an aluminum barrel containing frozen juice so as to liquefy the contents practically from the outside in, and if the liquid is allowed to run away as formed from the remaining ice and collected in portions, it will be found that the first liquid has a less concentration of soluble solids than the juice placed in the barrel, for as already mentioned, the ice phase forms on the outside first and the remaining liquid is thereby concentrated.

According to this invention, heat is applied to the virtually solidified mass, not at a high temperature, but at a temperature below the freezing point of water and at which a full-flavored liquid is formed and set free to separate itself from the remaining solid portion and films adhering thereto. Also the heat is applied in such manner that it is well distributed and equally effective, in a practical sense, on the mass as a whole. Thus a given amount of heat exerts its effects through all the ice and is manifest in a concentrated liquid coming away and filtering out of the mass if there is a chance for it to run away by gravity. I have pointed out that there are "argols" present in grape juice. I have also indicated the presence of other sediment that is associated with the juice of grapes and other fruits. I have not studied this sediment in detail enough to state its exact composition, however, as the concentrate separates and comes away, I have noted several novel results. These are manifest in the remaining mass serving as a filtering agent, in the concentrate having full aroma, color, flavor, etc. The ice crystals may be regular and quite compact when the heat additions are commenced and change to large scale-like formations that resemble disintegrating sheets of mica in appearance. Noteworthy is it that while at the start, the whole mass may have a temperature that is constant, the addition of a little heat may cause a change that results in the lowering of the temperature of the whole.

In general the amount of heat required to be taken away in the freezing of an object is considered to be the sum of the heat extraction required to lower it to its freezing point and to change the amount of water present to ice. I have found, however, that I do not extract this amount of heat for, somehow, in the cooling of liquids containing sugar and colloids there is produced a solidarity beyond what the heat extraction alone should produce. If the mass is slow frozen part of this rigidity is due to the structural support of the large ice crystals in the mass, but it is also due in part, to jellations and viscosity aspects which often appear not comprehended by those unskilled in the arts of jellymaking.

The composition of grape juice is complex but, on a percentage basis it is mostly water, next in quantity are sugars of which the mixture present in the Concord grape is such as to closely approximate invert sugar. It is held, by some, that juices should be concentrated to the extent that they contain sixty-five or more percent of soluble solids. I disagree with this because not only are the sugars actually present in many juices not soluble in such high concentration but other natural substances, present as colloids, acids, etc. cause jells and such high viscosities to prevail that solutions of the high concentrations indicated as above stated cannot drain away in any practical manner. In a copending application for Letters Patent Serial Number 304,954 filed November 17, 1935, I have discussed the properties of sugar solutions in relation to extractives from plants, different temperatures, the ability of such solutions to flow, transfer of heat, etc. In the treatment of Concord grape juice by this invention, the highest concentration of pure concentrates that I obtain is not much in excess of fifty percent soluble solids.

Concentration of concentrate that can be drained away at any given time is a combined result of the solubilities of the substances present as influenced by temperature and the physical properties of the mixture. Jellations and viscosities, above certain limits, prevent the liquid from separating from the ice and other solids and, after each further addition of heat, except at eutectic points. the concentrate generally is of less strength. There are exceptions to this, namely, in the first stages of the separation, which may extend over a period of several hours (days for large masses) while the released liquid in the form of syrup is becoming low enough in viscosity to work out through the mass filtering itself etc. It is possible also that pockets may exist in the ice formations that are not free draining, and these, until the ice structure rearranges itself, do not yield their full quota of highly concentrated juice. At the last, the liquid obtained is a cleaning up from the ice of the small amounts of substances still remaining.

Another procedure in treating the virtually solidified mass according to my invention is to allow its temperature to rise to a point, below the freezing point of water, at which the concentration of the freed liquid will be a percentage desired for separation. The liquid is then drawn off. This operation is repeated at higher temperatures, with drawing off the resulting less concentrated liquid corresponding to the temperature or being slightly more concentrated than the temperature should produce. Portions are treated as though they were original juice and concentrated either alone or with other material, as desired.

When the ice and solid material remaining has nearly all of the juice constituents removed—the point of economical removal varies with the particular setup—the ice may be allowed to melt with the water resulting therefrom draining away and leaving the material that has been precipitated or filtered out. If the treatments have been made on Concord grape juice the remainder is crude "argols." With other substances the filtering by the ice can leave substances that then can be easily obtained.

I have experienced difficulties in concentrating very dilute solutions and to such solutions I add sugar, preferably invert sugar, in quantity enough to lower their freezing points to a practical degree, before concentrating them. It is my desire that all the solutions that are carried down to the almost solid state by the withdrawal of heat shall be of high enough concentrations to have a freezing point of at least as low as approximately 31 degrees Fahrenheit. I may take material from which ice has been separated, and refreeze it to increase its concentration or I may mix it with more concentrated material to get products of the types that I desire. An example of this last is that a product with the soluble solids content of normal grape juice may be produced by adding sufficient of the concentrate to separated liquid that has less than the normal strength—such as that which comes off at the end of the ice separation step.

I have pointed out that I get jellations from natural materials present in many products and can not carry the concentrations up to or above those of "refiners' syrup." It is my practice to make solutions having high concentrations of soluble solids by adding sugars to my concentrates in accord with the practices of those skilled in sugar syrup technic.

It has been recognized that certain flavoring materials are lost in frozen products, such as ice cream, by what is termed "freezing out." The presence of a medium in which flavors are soluble is desirable. I am not familiar with all the mechanics of such phenomena but find it advantageous in certain instances to remove and collect the "esters," in the manner described in my Patent 2,342,962, from the mass before the separation of the juice and reincorporate the "ester" portion with the products concentrated by this invention, often, with the addition of sugars carrying fructose.

I find, in practice, that coloring matter and other constituents that separate as sediment in the usual processes are retained in my products in larger amounts than customary. As no heating is involved in my procedure I do not make these constituents inactive and insoluble by the consequences of heating and, when they are present in excess throughout the ice mass, they are dissolved into the product to the full concentration that their specific solubilities and concentrations and the time allow. It is a rule that the solubilities generally increase with increased temperatures. My processing is carried out at temperatures below those at which the products will be held in commerce and so the filtering that they get in the separation and concentration steps usually makes them safe from subsequent sedimentation. In some cases the juices do not come away clear in the separating step, as when in the drawing off, sediment outside the ice is washed along with them. In such cases I find that undissolved matter quickly settles and the solution is readily separated therefrom. As another example, I may, however, pour the liquid while cold on the mass of ice particles from which it was separated so that it percolates through the mass. It then comes out clear.

Every species of fruit is prime for processing for only a short period in each year. There is a rush in that period to get the year's requirements preserved. In previous practice, many processes that would be slower than the customary or which would, on being carried out more slowly, conserve more of the "natural," have been discarded because of the lack of time, or the extra equipment, power etc. that would be required. I have mentioned that my procedures are easily handled, that they can be conservative in the use of heat and cold in the seasonal periods etc. That the crushing or pressing step in usual practice could be more advantageously carried out to get natural color at lower temperatures has been mentioned. I use the lower temperatures in my processes and can allow ample time, after initial chilling of crushed fruit and placement in the storage containers, for the color etc. to be extracted. I can delay solidification until the color extraction has been sufficient.

Another procedure that can be employed to save time in rush periods and where the gains more than offset the disadvantages due to extraction of somewhat more matter than is desired from seeds, etc., when allowed to stand in storage is to take the grape mass direct from the stemmers, rapidly bring it to near its freezing point by passing it over coils that are properly refrigerated, then store the mixture at temperatures around its freezing point until the color and other desired constituents have come out into the solution, next allow a portion of the juice to run off and concentrate it, by the freezing and separating procedure described, then add the concentrate to the remaining material after the same has been put through a finisher to remove skins, seeds and other refuse and make superior products from the same. A variation is to add some sugar to the mass as, before, or after it is cooled. If sugars are added in excess of the normal amounts they draw out color, flavor, etc., give a different argol formation and in the preparation of products later more than pay for the added investment involved during the storage period.

There are two general ways of treating products in the average plant that produces juices and other products, namely, pulping and pressing. In pulping the prepared washed and cleansed fruit, usually after heating, is put through a machine called a "finisher" or "pulper" that separates the juice and all except the hard parts. These latter, consisting of the skins, seeds, cores, etc., are separated out from the more or less liquid mass (the pulped product). In pressing, the washed, cleaned and prepared product, with usually some heating and disintegration, is put inside blankets and subjected to pressure which causes the juice to separate from the solids (pomace) not in solution. The processor in the producing season has to decide on the amounts of pulp and juice he will prepare. In usual procedures it is not readily possible to get quality juice from pulp because too much heat has been used in its preparation. Juice, also, can not serve as pulp for the vegetable material is absent.

For adaptability, the "cold pack" method of preserving fruit has been employed. The usual "cold pack" is to take fruit and sugar in definite proportions and place them together in containers which are placed in low temperature rooms where it is hoped that they will freeze either before spoilage or too great an extraction of juice from the fruit takes place. In my procedures the ordinary "cold pack" may be used as a means of temporary preserving. I have, however, invented a modified cold pack process that has distinct advantages. It is to spray the fruit with a recirculated low viscosity refrigerated solution containing sugars and fruit extractives of the fruits to be treated at temperatures in the range of from plus 10 degrees to plus 20 degrees Fahrenheit in volume great enough to bring the fruit almost immediately to such a low temperature that the amount of heat remaining in the fruit will not afterwards raise the treated fruit above its freezing point. I place the refrigerated fruit in containers with sugar syrup or sugar and freeze the same. There is always some syrup left with the fruit from the refrigerating step and so the sugar pack carries more or less solution. Later the mass can be defrosted and concentrated—as to its liquid portion—according to this invention. Again, the liquid portion may be concentrated so that when put back with the remainder and given minimum heating, with proper added sugar addition if needed, superior products of the preserve types will result. Another procedure is to pulp the defrosted mass and use it in the production of quality products which will be found to have "Natural" characteristics.

In the application of my process to tomato juice I am dealing with a product that depends on its finely divided pulp for most of its red coloring. Here the juice is, in reality, a very finely pulped product of a vegetable. The juice is cooled to approximately its freezing point, filled into holding containers and then further cooled until it is quite solid. The tomato concentrate separated therefrom by my process is mainly a straw colored liquid as it filters out through the ice mass. The pulp that has been left may be easily gathered for addition to the concentrate by allowing the ice to melt and separate, after which the pulp remains. This remainder may be reincorporated with the juice on the basis of the original amount present with a given amount of liquid.

It is common practice in filtering grape juice and other materials carrying finely divided material to use filter earth, etc., and to employ filter presses of various kinds. In this invention I have demonstrated a new filtering medium, namely, ice crystals used below their melting point. The ice makes no undesired alterations in the color or the flavor of the products and is, in many cases, separated from the filtered out material by simply allowing the ice to melt and the water to run away. The term ice as used in reference to a filtering agent, obviously does not means large pieces of ice any more than the term sand would mean large pieces of rock. The term is used in a general sense, however, including snow, sleet and other particles of solidified water, which may be of any degree of fineness suitable for filtering.

Since ice has a specific gravity less than water, the methods of using it are not the same as followed in using heavier filter media, such as sand, for example. In those cases where the entire contents of a container have been solidified by subtracting heat therefrom, and where fractions are liquefied by the controlled heat additions, the residual ice is so distributed throughout the container that the liquid, as it is formed, is easily filtered out by gravity. In other applications, where the ice is floating on the liquid, the filtering operation may be controlled by the relation of the depth of ice and the rate of the rise of the liquid through it. The material filtered out from the liquid will be largely on the bottom of the ice mass and on the bottom of the container and, in many cases, can be settled down away from the ice at the bottom of the container. I do not attempt here to discuss all of the ways in which ice can be used for filtration; but may state by way of example that filters may be made of sheets of screen cloth and a layer or layers of ice particles confined between them. These can be so placed in equipment that the liquid passes down through them and away by gravity.

Another illustration of my process is the treatment of apples to make either a concentrated juice or a distinctive juice. The juice is pressed out, cooled over coils to or approximately its freezing point, after which it is stored in containers, as tanks, barrels etc. at lower temperatures such that ice forms and thickens as the juice concentrates. The mass is cooled until it is quite solid. Thereafter heat is added slowly to such a mass so that its effects are virtually equal throughout the mass. The solution, as it separates, is collected in lots of different concentrations and the separation of juice from the mass is continued, for example, until the Brix is 3. The more dilute portions may be concentrated or mixed with portions of greater strengths to produce a liquid having the desired concentrations.

Extracts and infusions obtained from various plants, including those from which drugs are obtained, by percolation or other procedure in which water is used as a solvent, are usually weak in total solids present in solution, but have desirable properties and characteristics. In such cases the content of soluble solids is not great enough to lower the freezing point of the solution appreciably below the freezing point of pure water. Many of the substances of the character here referred to are not soluble in water in sufficient quantities to change the freezing point sufficiently to permit concentration of the dissolved substance and separation of the concentrate by the unmodified procedure before described. However, the concentration can be effected by the addition of other soluble substances which substantially lower the freezing points of the solutions.

A further phase of the invention resides in treatments by which weak solutions are conditioned for concentration of specific soluble solids therein and separation of extracts therefrom by controlled additions of heat. Illustrative examples of this phase of the invention are set forth as follows:

I. A solution having a freezing point of 30 degrees Fahrenheit or less, with or without the desired substances in it, is held at its freezing point, with heat being slowly withdrawn, and with a goodly portion of ice crystals present in it. The solution is kept in motion but care is taken that the energy applied in moving the liquid does not produce enough heat in the liquid to change the desired conditions. The solution to be concentrated is cooled to approximately its freezing point and added to the mixture of ice and solution with the result that water separates therefrom by crystallizing as ice on the ice already present. A variation often made is to take off solution that has attained vendable concentrations of the desired substances by the above procedure.

II. When the product desired is one of those which are put out for use in preparations carrying alcohol, sugar, glycerine or other soluble or miscible substance of which the freezing point is below the freezing point of water, a solution containing one or more of such substances is made up and cooled below the freezing point of water, and as much lower as may be necessary to cause formation and accumulation of ice in the plant extract when added thereto. Such solution is added to the plant extract (either with or without a content of ice "seed," as desired). The plant extract is thereby so chilled that a prescribed portion of its water is separated out as ice and the desired ingredients are concentrated. Concentration so caused may be carried to the point where the desired ingredients are precipitated as solids.

III. When the substance sought is insoluble in highly concentrated solutions of the above named additional substances, as, for example, alcohol above a specific strength, the temperature may be held low enough to cause increase of ice formation and consequently increased concentration of alcohol, as well as of the matter in solution, or concentrated alcohol may be added with or without the formation of more ice. The substance to be recovered is thereby precipitated. Then the solution is drained off, leaving the precipitate and ice. If the precipitate has been deposited on the ice which has served as a filtering medium, the ice may be carefully melted away leaving a solid that is relatively pure. The water of the ice with some of the precipitated substances re-dissolved in it may be used again as an extracting agent and later concentrated. It is necessary to keep the solution at temperatures below where there would be equilibrium between the ice phase and water. Since glycerine, sugars, etc. have the ability of holding back the formation of ice, their specific retarding effects on ice separation must be overcome by lower temperatures and perhaps agitation.

In carrying out any of the foregoing procedures, the addition of the solution from which the water is to be separated as ice must be so regulated that it is not "quick frozen" "en masse" before there is separation of the constituents.

IV. Another technic is to add a small amount of the liquid to be concentrated to a solution carrying the ice crystals and solution slightly on the side where the ice is going into solution and then to lower the temperature of the mixture with the production of the change to where the ice separates, continuing until considerable concentration has resulted, then adding more of the liquid to be concentrated and continuing. It is optional, after the concentration has become great enough, to carry the whole mass to almost the solid state and use the technic of separating out concentrate as has already been described.

It is admitted that taking any solution by heat extraction down below the point, in temperature, at which it should be at equilibrium as to the water-ice phases, exerts pressure, of itself, towards the formation of ice. This is a general principle, however, which is modified in cases where natural colloids, and substantial quantities of sugars are present. As it is often better to go all the way across a busy thoroughfare before reversing direction, I have discovered that carrying solutions below the points in temperature at which they should have the concentrations I desire is the best way to make practical applications of concentrating through the separation of ice.

I have discovered that the mechanics of the solution can be different just as soon as some other substance besides ice is coming out of solution on the further extraction of heat. If, for example, lactose is present, in solid form, and in solution, and there is ice also, I have noted a tendency for the lactose that is out of solution to go into solution, with a very limited but temporary prevention of further formation of ice when water is added for separation by the temperature lowering step. Inside close ranges the heat of solution, latent heat of melting, and the production of a condition that gives a new phase of a substance must be thought of and the results interpreted in the light of whether the direction is first affected by exothermic or endothermic phenomena.

It will be seen from the foregoing description that I have developed a novel use of refrigeration in concentrating products in solution and a new method of filtering etc.

It will be understood that the processes set forth above may be varied according to the type of products treated without departing from the inventions. Therefore, the above description should be considered as illustrative only and not as limiting the scope of the following claims.

I claim:

1. The method of producing a liquid concentrate from a liquid plant product containing soluble solids in solution, which comprises freezing a body of such solution to substantial solidity throughout, then adding heat under control as to temperature and rate of application so that the effects of the heat additions are substantially uniformly distributed throughout the mass and the temperature of the mass is maintained below the freezing point of water in such measure that liquid is produced, and allowing the liquid to drain away from the unliquefied portion of the mass.

2. The method of obtaining separate fractions of a plant extract containing soluble solids in solution and insoluble solid matter in suspension, which comprises withdrawing heat from a body of such extract until said body is frozen to substantial solidity throughout, then adding heat so that its effects during the addition thereof are substantially uniformly distributed throughout the frozen mass at a temperature below the freezing point of water and in degree and quantity sufficient to liquefy a concentrated fraction of the solution, withdrawing the fraction liquefied by the heat so applied, further liquefying less concentrated proportions of the solution by similarly adding increments of heat at temperatures below the freezing point of water, draining away the liquefied fractions from the ice in the mass, and separating solid substances left with the ice by melting the ice and withdrawing the water of liquefaction from the solid residue.

3. The method of obtaining a concentrated solution of soluble solid matter from a more dilute solution containing such matter and of which the freezing temperature is lower than that of the solvent liquid, which comprises withdrawing heat from a body of the solution until such body is frozen substantially solid, then adding heat to the frozen mass at a temperature below the freezing point of the solvent but sufficient to liquefy the concentrated solution sought, and at a rate such that the heating effect is distributed substantially uniformly throughout the mass, and taking the fluid solution from the frozen mass.

4. The method of preserving and concentrating fruit juice, which comprises disintegrating freshly gathered fruit, quickly chilling the disintegrated fruit to a temperature near the freezing point of the liquid portion thereof, maintaining the chilled fruit material at substantially the same temperature for an extended period of time until color and other desired constituents have passed from the skins into the juice, then separating juice from the pulp, separating the fruit pulp from the refuse matter of the fruit, freezing the previously separated juice to a substantially solid mass, applying heat to the frozen mass under control as to temperature and rate of application such that a concentrated fraction only of the juice is liquefied, separating such liquefied portion from the remaining ice mass, and combining the fruit pulp and concentrated juice.

5. The method of obtaining a concentrated extract of tomato juice, which consists in extracting juice from ripe tomatoes, rapidly cooling the juice immediately after extraction to approximately its freezing temperature, placing the cooled juice in a container and further chilling it until it is substantially solid throughout, adding heat at a rate and in an amount such that the mass of frozen juice is heated substantially uniformly throughout to a temperature above the freezing point of concentrated juice but below that of water, draining the liquid produced thereby from the unmelted ice remainder of the mass, separately melting the ice, separating the water of liquefaction from the residue of finely divided tomato pulp left intermingled with the ice after draining of the melted juice fraction therefrom, and combining the recovered pulp with the juice.

6. The method of obtaining a concentrated fruit extract, which comprises subjecting freshly extracted fruit juice to distillation under high vacuum, condensing the volatile vapors resulting therefrom at low temperature, freezing the remaining liquid to substantial solidity throughout, adding heat to a mass of the frozen juice so that the heat additions are distributed substantially uniformly throughout the mass in quantity and temperature sufficient to produce a free liquid containing a concentrated solution of the soluble solids in the juice, while maintaining the temperature of the mass lower than the freezing point of water, separating the resulting liquid from the residual ice, and adding the condensate from the vacuum distillation step to said liquid.

7. The method of obtaining a concentrated product from a solution of which the freezing point is substantially the same as that of the pure solvent, which consists in dissolving in the solution a quantity of soluble matter sufficient to produce a solution of which the freezing point is substantially lower than that of the original solution, freezing a mass of the solution, heating the mass to a degree, lower than the melting point of the solvent, at which a concentrated fraction of the solution liquefies, and separating from the mass such liquefied fraction.

HARRY A. NOYES.